United States Patent [19]

Bouchard et al.

[11] 4,055,759

[45] Oct. 25, 1977

[54] SIGNAL DEVICE USING PERCUSSIVE FLASHLAMPS

[75] Inventors: Andre C. Bouchard, Peabody; Harold H. Hall, Jr., Marblehead; Renaldo Mercaldi, Beverly; Thomas J. Sentementes, Wakefield, all of Mass.

[73] Assignee: GTE Sylvania Incorporated, Stamford, Conn.

[21] Appl. No.: 696,107

[22] Filed: June 14, 1976

[51] Int. Cl.² ............................................. G03B 15/02
[52] U.S. Cl. .................................... 362/159; 354/142; 362/13
[58] Field of Search ................ 240/1.3, 9 R; 354/142, 354/141, 143; 431/92, 93, 94

[56] References Cited

U.S. PATENT DOCUMENTS

| 3,545,904 | 12/1970 | Brandt | 354/143 X |
|---|---|---|---|
| 3,727,040 | 4/1973 | Armstrong et al. | 240/1.3 |
| 3,735,111 | 5/1973 | Shaffer | 240/1.3 |
| 3,753,390 | 8/1973 | Hough et al. | 431/92 X |
| 3,769,501 | 10/1973 | McDonough | 240/1.3 |
| 3,783,260 | 1/1974 | Broadt | 240/1.3 |
| 3,795,477 | 3/1974 | Broadt | 431/93 |
| 3,812,339 | 5/1974 | Braodt | 240/1.3 |
| 3,906,524 | 9/1975 | Oshima | 354/142 |
| 3,947,221 | 3/1976 | Mauser | 431/93 |
| 3,958,115 | 5/1976 | Schmidt | 240/1.3 |

Primary Examiner—Edna M. O'Connor
Attorney, Agent, or Firm—Edward J. Coleman

[57] ABSTRACT

A signal device comprising a partially transparent package containing a plurality of percussively-ignitable flashlamps arranged in an array with respectively associated preenergized striker springs, and a movable member for sequentially releasing the striker springs to fire respective flashlamps in response to successive indexing. The device is adapted to be hand held and the movable member is adapted to be actuated and indexed directly by hand.

9 Claims, 4 Drawing Figures

U.S. Patent     October 25, 1977     4,055,759

SIGNAL DEVICE USING PERCUSSIVE FLASHLAMPS

BACKGROUND OF THE INVENTION

This invention relates to signaling devices and, more particularly, to flashing-light type signaling devices intended for use by boaters, campers, entertainers, motorists, military personnel, or any one wishing to attract attention.

A variety of signal devices are presently available on the consumer market. For example, chemical flares have been available for some time to motorist, campers and boaters. Similarly, flashing devices using pulses of light from incandescent lamp sources have been widely available, many of which can be purchased with extension cords which, for example, plug into an automobile cigarette lighter receptacle. Xenon flash units, some hermetically sealed, are also available to military personnel and yachtsmen and offer many repetitive bursts of light for signaling purposes.

Chemical flare signaling devices, especially the hand held types, have a significant disadvantage, however, in that they can be quite hazardous in the hands of children or adults inexperienced with their usage, as the pyrotechnic chemicals in such devices can cause severe burns. For marine applications, the hand held flares have additional disadvantages in that they typically are quite bulky, thereby making their attachment to life vests virtually impossible, and there is a possibility that the devices can become inoperative due to prolonged water exposure.

Flare launching devices which are available to propel pyrotechnic flares 100 to 300 feet into the air have similar disadvantages to hand held flares, with the additional disadvantage of being quite costly, thereby limiting their usage to professional yachtsmen.

Incandescent signaling devices, while not possessing the handling dangers associated with the chemical types, pose the disadvantages in many applications of requiring batteries, which can degenerate upon storage, thereby significantly reducing the user's confidence level that the device will operate when needed. Plug-in incandescent devices, such as those offered to motorists for distress signaling, pose a problem in that the long cords used with such devices can become entangled sufficiently to delay their availability for immediate usage. Further, automobile battery failures due to faulty electric generating equipment, for example, would render such device useless. Battery operated incandescent devices manufactured for marine usage pose the following additional problems. The corrosive ocean atmosphere undoubtedly accelerates failure of both the battery and its contacts. Moreover, prolonged periods of intense cold or heat, such as encountered at sea, will accelerate such failures. A further disadvantage of the incandescent lamp device is that the intensity of the light pulses would not be sufficient for effective use during day time rescue missions.

Xenon flashing devices powered by solid state circuitry overcome many of the disadvantages associated with chemical and incandescent signaling devices; however, their basic disadvantages include the need for batteries and their relatively high cost.

SUMMARY OF THE INVENTION

Accordingly, it is an object of the present invention to provide an improved signal device which is compact, light weight, and does not require batteries or an electric cord connection for operation.

A particular object of the invention is to provide an improved signal device of the type which generates intense flashes of light.

A further object is to provide a signal device which is relatively inexpensive and considerably less complicated and safer to use than previously available devices such as pyrotechnic flares.

These and other objects, advantages and features are attained, in accordance with the invention, by a hand held signal device comprising a plurality of percussively-ignitable flashlamps mounted on a support member along with a plurality of preenergized strikers, each releasable to fire a respective flashlamp. A movable means is retained in the support member in operative alignment with the strikers and adapted to be directly actuated by hand. A projection from the movable means sequentially releases the preenergized strikers to fire respective ones of the flashlamps in response to successive hand indexing of the movable means.

In a preferred embodiment, light-shield partitions are disposed between respective pairs of the flashlamps to prevent sympathetic ignition, and a cover having at least one transparent side is affixed to the support member so as to enclose the assembly. The movable means comprises a slidable member retained in a longitudinal channel and having an attached button which is externally accessible for indexing by hand to operate the signal device.

BRIEF DESCRIPTION OF THE DRAWINGS

This invention will be more fully described in conjunction with the accompanying drawings, in which.

DESCRIPTION OF THE PREFERRED EMBODIMENT

Figure 1:
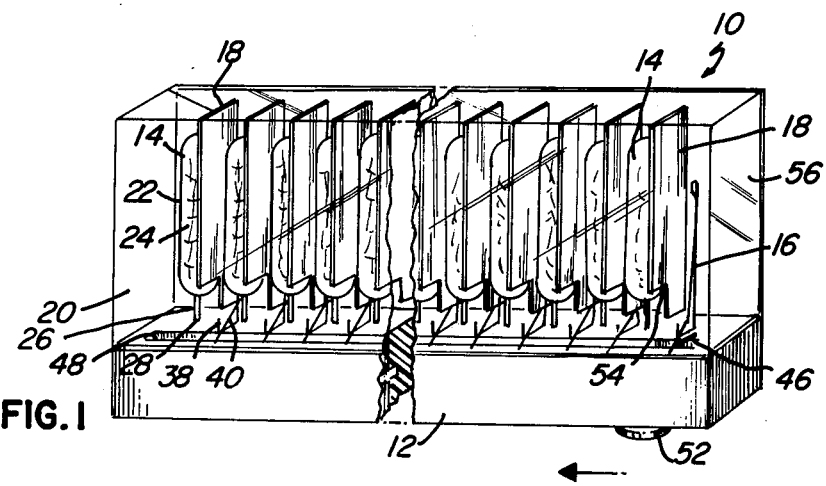
FIG. 1 is a perspective view of the exterior of one embodiment of a signal device using percussive flashlamps in accordance with the invention.

In the specific embodiment illustrated in FIGS. 1-4, the signal device 10 comprises a support member 12 having a plurality of percussively ignitable flashlamps 14 and a like plurality of respectively associated preenergized striker springs 16 mounted on its upper surface. The flashlamps are arranged in a row so as to form a linear array, and each of the preenergized striker springs is positioned in operative relationship with a respective one of the lamps.

In order to prevent sympathetic ignition of adjacent lamps, the device further includes a plurality of light-shield partitions 18 disposed between respective pairs of the flashlamps. To complete the unit, the assemblage of lamps, striker springs and partitions is enclosed in a transparent cover 20 affixed to the support member 12.

Each of the lamps 14 is substantially identical and comprises an hermetically sealed light-transmitting envelope 22 having a primer depending therefrom and a filling of combustible foil 24 and a combustion-supporting gas disposed therein. The primer comprises a metal tube 26 within which a wire anvil and a charge of fulminating material are disposed. Each lamp is vertically supported in member 12 by means of a respective bore 28 into which the primer tube 26 is inserted.

Figure 4:
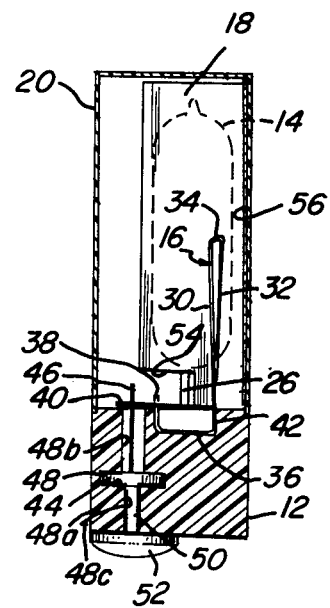
FIG. 4 is an enlarged sectional view on line 4—4 of of FIG. 2 which shows one of the striker springs and its position with respect to the slidable member.

Each of the preenergized striker springs 16 is substantially identical and comprises a folded torsion device typically formed from 0.021 inch music wire about 2.5 inches long. Referring to FIG. 4, and the numerically identified elements of spring 16, the wire is shaped to form a hairpin torsional section having segments 30 and 32 joined by a bight 34. The end portion of segment 30 is shaped to define a stationary supporting foot 36, the tip of which is shaped to define a catch 38. The end portion of segment 32 is shaped to define a striker 40, which when the spring is preenergized, or cocked, as shown, crosses over the supporting foot 36 and is retained by catch 38. The stationary supporting foot 36 is seated in an elongated slot formed in the support member 12, the slot being sufficiently shallow so that the catch 38 formed in the free end of foot 36 will project above the upper surface of support member 12.

Initially, the striker 40 may be formed at an angle of about 90° to the stationary supporting foot 36, although the angle through which the striker is rotated to position it behind catch 38, as shown, may be of any value that does not cause overstressing of the wire. The support member 12 is shaped to provide a suitable bearing surface 42 for the heel of the striker during cocking. This bearing surface also aids in preventing accidental displacement of the spring sufficiently to free the striker from the catch sometime after cocking and before firing is intended.

Figure 2:
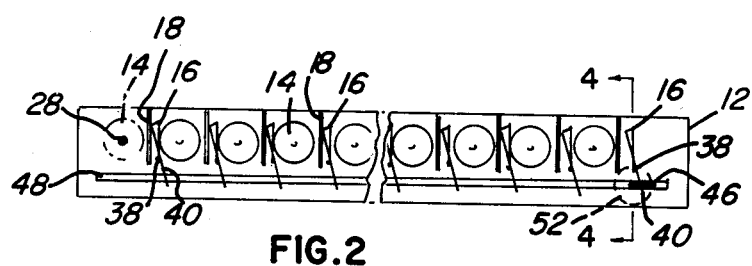
FIG. 2 is a top plane view of the signal device of FIG. 1 with the cover removed and one flashlamp shown in phantom.
Figure 3:
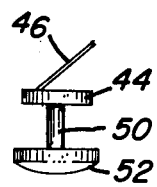
FIG. 3 is an enlarged scale detail view, in perspective, of the slidable member in the device of FIG. 1.

Sequential displacement of each cocked striker 40, to release it from the catch 38 and thus permit it to strike the respective primer tube 26 and fire the associated lamp, is effected by a relatively simple, indexable release arrangement adapted to be actuated by hand. Referring to FIGS. 2-4, the movable release means comprises a slidable member 44 having a trip wire 46 projecting upwardly at an angle therefrom. The slidable member 44 is retained in a longitudinal channel 48 in support member 12 which is located parallel to the row of lamps 14. As shown in FIG. 4, channel 48 has a sectional configuration which is somewhat cross-shaped with a horizontal portion 48a and upper and lower vertical portions 48b and 48c respectively. As shown, slidable member 44 which may be a short bar or a disc, is retained in the horizontal portion 48a, and channel portion 48b provides an access way for the projecting trip wire 46 adjacent to the row of strikers. Channel portion 48c, on the other hand, provides an access way for the shaft portion 50 by which a button 52 is attached to the slidable member 44. In this manner, button 52 is disposed on the exterior of the enclosure, as illustrated, and is thereby available for indexing by hand.

Each cocked striker 40 of the springs 16 projects beyond the periphery of channel 48 to overlie portion 48b. In particular, the free end of each striker 40 is disposed to lie in the path of travel of the trip wire 46 slidable member 44. Hence upon translationally indexing member 44 along channel 48, the striker adjacent to the upcoming trip wire 46 is pushed upwardly by the sloped projection thereof a distance sufficient to clear the top of catch 38. The striker then swings clockwise as viewed from above, and hits and indents the impact sensitive primer tube 26 at a high velocity to cause deflagration of the fulminating material located herein and thus ignite the combustible foil 24.

In the accompanying drawings, each partition 18 is illustrated as being disposed between a respective lamp 14 and the striker spring 16 for firing that lamp. Accordingly, to permit free operation of each striker portion 40 in firing a respective lamp as described above, a clearance notch 54 is provided at the bottom portion of each partition 18. The bottom portion of partition 18 may be secured to support member 12 by being wedged into a slot therein.

In addition to the above described components, the signal device assembly may further include a sheet of reflecting material 56 along the interior of what may be called the rear sidewall of cover 20. The reflecting surface of sheet 56 is inserted so as to face the lamps and function as a reflector of visible light to enhance the signaling affect, as a heat shield with respect to the hand of the user, or as a mirror for daytime signaling purposes. The exterior surface of partitions 18 may also be made reflecting, such as by aluminizing, if desired. In addition to the reflector sheet insert, a filter sheet, such as a cellulose acetate color filter, approximately the same size as the reflector insert may be secured to the opposite inside surface of the cover, i.e., the light transmitting side wall thereof. This color filter, whether blue, yellow, orange, red or other color may serve to draw viewer attention to the device upon firing, or also function as a decorative feature.

Prior to initial operation, the slider button is positioned to one end of the longitudinal slot 48, as illustrated in FIG. 2, the striker springs are energized (cocked), the lamps and shields are inserted, and the cover 20 is secured, such as by adhesive or heat sealing, to the support member 12. To operate the device, a user simply grasps the periphery of the unit enclosure with one or two hands, faces the lamp in the direction of the intended viewer, and with his thumb slides button 52 along the slotted channel 48 to trip the first striker engaged and fire the respective flashlamp. The resulting flash of light output, which is similar to that employed in photoflash applications, is both attention-getting and readily observable at significant distances, even in daylight.

The flashlamps employed in the signal device may be similar to those described in U.S. Pat. No. 3,535,063, and the preenergized striker springs may be similar to those described in U.S. Pat. No. 3,597,604. Cover 20 may be molded of transparent polystyrene, and the reflector sheet 56 may comprise a plastic material that is heavily aluminized on one side (that facing the lamps), and coated on the other side with various decorative colors. Support member 12 may be molded of phenolic plastic; the slidable member may be formed of metal; and partition 18 may be formed of metal or plastic.

The above-described device provides a number of significant advantages over existing signaling devices. First, and probably foremost, our device does not require batteries for operation. Secondly, the device is lightweight; it is small and can easily fit, for example, in a shirt pocket, glove compartment, or can be attached to a life vest jacket. Our device is considerably less complicated and safer to use than some other devices, such as pyrotechnic flares. Our device delivers very intense pulses of light which can be seen in both darkness and daylight, as opposed to some devices presently marketed. Another important feature of our invention is its relatively inexpensive construction. Thus, while a xenon flash device may offer the advantage of many more flashes—assuming no dead batteries—we feel that the high cost of xenon safety flashlamps limits their usefulness in terms of the number of people who can afford them.

Although the invention has been described with respect to a specific embodiment, it will be appreciated that modifications and changes may be made by those skilled in the art without departing from the true spirit and scope of the invention. For example, the number of springs and lamps in the device can be varied, and other hand-actuatable, movable means may be provided for releasing the striker springs. As an example of the latter, the movable means may comprise a friction drive band mounted on plastic rollers and having a projection for tripping the strikers; a portion of the band may be caused, by means of a cam surface, to protrude from the support member whereby it is accessible to be pushed along by the user's thumb so as to translate the projection along the slot to release the strikers. In yet another variation, the movable means may comprise a plurality of breakaway buttons in the plastic support member, each button being associated with a respective one of the striker springs; the user would merely push a button to release the associated spring and fire a respective lamp. This latter packaging variation is particularly suited to hermetic sealing, whereby it can be rendered waterproof prior to use so as to be particularly useful for marine applications.

What we claim is:

1. A signal device intended for hand operation comprising, in combination:
   a support member;
   a plurality of percussively-ignitable flashlamps mounted on said support member;
   a plurality of preenergized strikers mounted on said support member and releasable to fire said flashlamps;
   movable means retained in said support member in operative alignment with respect to said strikers and adapted to be directly actuated by hand; and,
   means provided on said movable means for sequentially releasing said preenergized strikers to fire respective ones of said flashlamps in response to successive hand indexing of said movable means.

2. The signal device of claim 1 wherein said array support member defines access means adjacent said strikers for enabling engagement with and release of each preenergized striker; said strikers are mounted so that, in the preenergized condition, said strikers project beyond a boundary of said access means; and, said hand movable means is so disposed that the path of travel of said releasing means is aligned with the projecting portions of said strikers.

3. The signal device of claim 2 wherein said access means comprises a longitudinal channel in said support member, said movable means is a slidable member retained in said channel, said release means is a projection from said slidable member, and said slidable member is operative upon translation along said channel to selectively release said strikers by means of said projection to thereby fire the respectively associated flashlamps.

4. The signal device of claim 3 further including a plurality of light-shield partitions disposed between respective pairs of said flashlamps, a cover affixed to said support member and enclosing said flashlamps, strikers and partitions, said cover having at least one transparent sidewall, and a button attached to said slidable member and disposed on the exterior of the enclosure formed by said cover and support member, whereby said button is accessible for indexing by hand.

5. The signal device of claim 1 wherein each of said flashlamps has a primer tube depending therefrom; said support member contains a plurality of bores each for receiving the primer tube of a respective one of said flashlamps to provide support therefor; and, each of said preenergized strikers is a portion of a folded torsion spring comprising a substantially hairpin torsional section having two segments joined by a bight, said striker projecting from one of said segments, a supporting foot projecting from the other of said segments and fixedly mounted on said support member, and a catch formed at the tip of said foot, said striker portion crossing said foot with said catch restraining said striker portion in a cocked condition.

6. The signal device of claim 1 further including a cover affixed to said support member and enclosing said flashlamps and strikers, said cover having at least one transparent sidewall.

7. The signal device of claim 6 further including hand operative means attached to said movable means and disposed on the exterior of the enclosure formed by said cover and support member, whereby said hand operative means is accessible for indexing.

8. The signal device of claim 7 further including a plurality of light-shield partitions disposed between respective pairs of said flashlamps within said enclosing cover.

9. The signal device of claim 1 wherein said lamps are mounted in a row on said support member so as to form a linear array.

* * * * *